(12) United States Patent
Lentine

(10) Patent No.: US 7,408,125 B2
(45) Date of Patent: Aug. 5, 2008

(54) FISH SCALE AND LENGTH MEASURING SENSOR

(76) Inventor: Gregory E. Lentine, 6881 Kingspointe Pkwy, Ste 8, Orlando, FL (US) 32819

( * ) Notice: Subject to any disclaimer, the term of this patent is extended or adjusted under 35 U.S.C. 154(b) by 0 days.

(21) Appl. No.: 11/497,974

(22) Filed: Aug. 2, 2006

(65) Prior Publication Data
US 2008/0029313 A1 Feb. 7, 2008

(51) Int. Cl.
G01G 19/00 (2006.01)
A01K 99/00 (2006.01)
G01S 3/80 (2006.01)

(52) U.S. Cl. .................. 177/148; 177/245; 33/700; 43/4; 367/107; 367/118

(58) Field of Classification Search .............. 177/131, 177/148, 149, 245; 33/700; 367/107, 108, 367/118; 43/4
See application file for complete search history.

(56) References Cited

U.S. PATENT DOCUMENTS

| 2,003,893 | A | * | 6/1935 | La Pan ................. 73/432.1 |
|---|---|---|---|---|
| 2,458,811 | A | * | 1/1949 | Von Koscielski ............. 33/760 |
| 2,570,538 | A | * | 10/1951 | Fincher et al. ............... 294/26 |
| 2,603,474 | A | * | 7/1952 | Mandolf et al. ............. 177/233 |
| 2,750,184 | A | * | 6/1956 | Warndahl .................... 177/127 |
| 2,780,795 | A | * | 2/1957 | Ambrosio .................. 367/108 |
| 3,003,239 | A | * | 10/1961 | Weidner et al. ............... 33/1 P |
| 3,508,623 | A | * | 4/1970 | Greenstein .................. 177/137 |
| 4,242,574 | A | * | 12/1980 | Grant .......................... 377/18 |
| 4,307,456 | A | * | 12/1981 | Ise et al. ...................... 367/107 |
| 4,336,855 | A | * | 6/1982 | Chen ........................... 177/245 |
| 4,518,052 | A | * | 5/1985 | Chen ........................... 177/245 |
| 4,660,666 | A | * | 4/1987 | Reder et al. ................. 177/148 |
| 4,923,024 | A | * | 5/1990 | Ferrer et al. ................ 177/245 |
| 5,027,526 | A | * | 7/1991 | Crane .......................... 33/763 |
| 5,031,710 | A | * | 7/1991 | Parker et al. ........... 177/210 FP |
| 5,119,585 | A | * | 6/1992 | Camp ......................... 43/53.5 |
| 5,142,793 | A | * | 9/1992 | Crane .......................... 33/763 |
| 5,148,411 | A | * | 9/1992 | Shalvi ........................ 367/108 |
| 5,763,837 | A | * | 6/1998 | Davignon et al. ........ 174/113 R |
| 5,894,678 | A | * | 4/1999 | Masreliez et al. ............. 33/762 |
| 6,608,261 | B2 | * | 8/2003 | Thadani ..................... 177/126 |
| 6,696,650 | B2 | * | 2/2004 | Muller et al. ............... 177/148 |
| 6,943,304 | B1 | * | 9/2005 | Brady et al. ................ 177/148 |
| 7,006,405 | B1 | * | 2/2006 | Huang ........................ 367/107 |
| 2005/0189153 | A1 | * | 9/2005 | Yang |
| 2006/0162229 | A1 | * | 7/2006 | Otsuka et al. |
| 2007/0045010 | A1 | * | 3/2007 | Kasperek |

* cited by examiner

*Primary Examiner*—Randy W Gibson
(74) *Attorney, Agent, or Firm*—Larry D. Johnson

(57) ABSTRACT

A fish length measuring apparatus that incorporates a digital scale allows fishermen to both measure and weigh their catch without touching or handling the fish. The apparatus incorporates a housing with a lip grip to grasp the mouth of the fish. A viewable digital output screen is connected to a weight-sensing member whereby the weight of the fish generates a digital numeric display. A distance-measuring sensor projects a beam towards a surface adjacent the tail of the fish and detects the reflection from that surface, then calculates the distance (i.e., length) and displays the length on the output screen. The contour of the housing facilitates hand-holding of the apparatus, and a variety of unique digital data may be selectively displayed on the output screen.

8 Claims, 3 Drawing Sheets

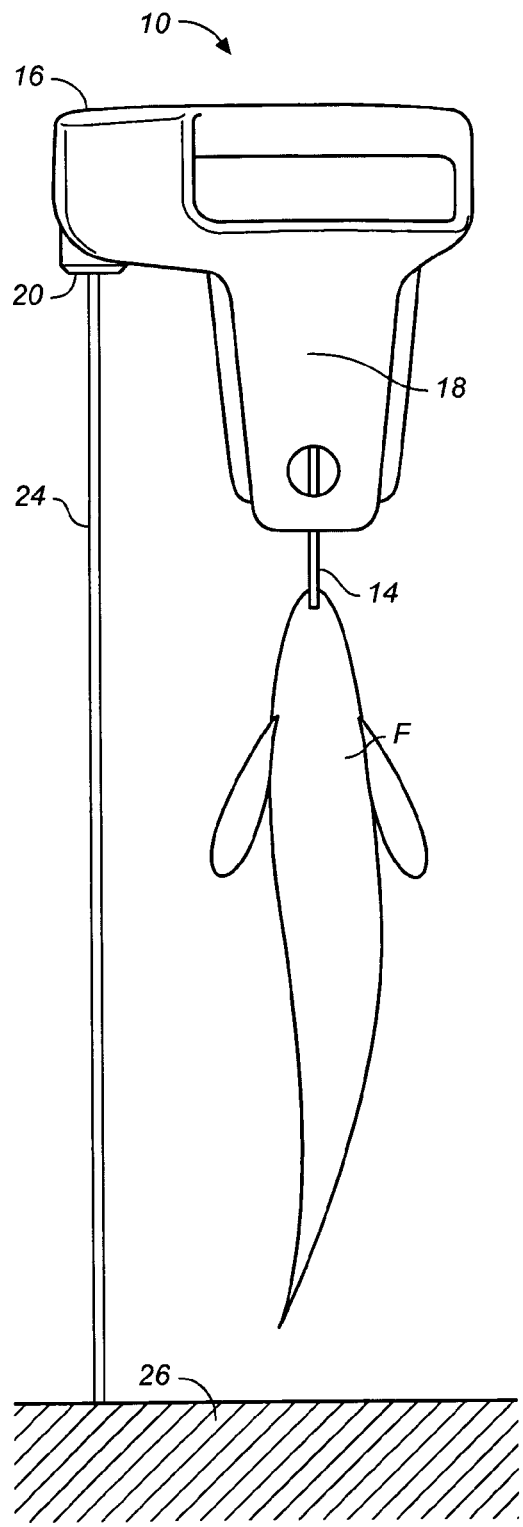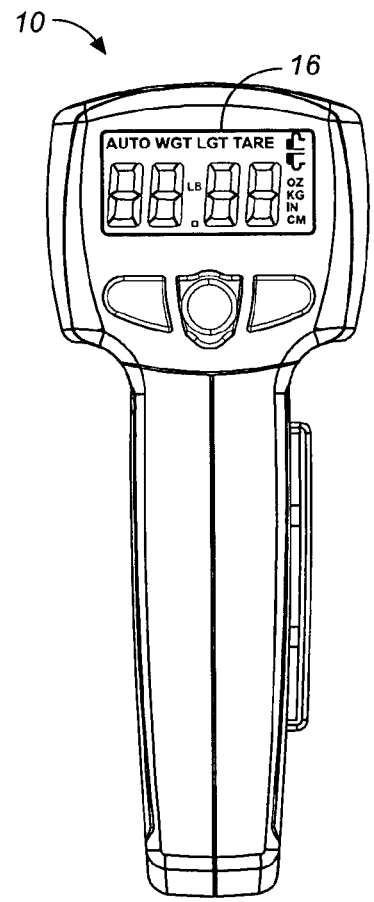
FIG. 3   FIG. 4

FISH SCALE AND LENGTH MEASURING SENSOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

1. Technical Field

The present invention relates generally to fishing tackle and fish handling equipment, and more particularly to an improved fish weighing and length measuring apparatus with a digital display.

2. Background Information and Discussion of Related Art

Traditional fish measuring devices require the fisherman to lay the fish on a measuring board or stretch out a conventional measuring tape along the length of the fish. Well documented research indicates that laying a fish on it side creates considerable damage to the internal organs of the fish, and removes the valuable bacteria-fighting "slime" from the outside of the fish. The precise weighing of the fish and the recordation of data is best accomplished with a fishing tool which does not injure the fish so that it may be safely returned to the water.

Sonic distance measuring devices (also referred to as range finders) are well known. Such measuring devices operate on the well-known principal of sonar by directing a sonic beam (a stream of acoustic waves) from the measuring device to the target, and then detecting the time of transit from the measuring device to the target and back to determine the distance from the measuring device to the target. While sonar is typically used underwater, for instance for submarine purposes, sonic commercial type measuring devices are often used in the building trades to measure relatively short distances, for instance, for determining the floor area of a room of a house or generally to measure distances of five feet to about one hundred feet. Typically the sonic pulses used in these devices are ultrasonic.

U.S. Pat. No. 6,696,650 to Muller, et al. describes a digital fish weighing device in the form of an electronic fish scale comprising a molded housing having upper and lower portions for supported hand grasping. An electronically controlled weight-sensing member and a viewable digital output screen are mounted within the housing. The output screen is electronically connected to the weight-sensing member whereby a weight held by gravity causes a digital numeric display on the output screen equal to the fish weight. A fish-engaging assembly extends downwardly from the weight-sensing member through an aperture formed in the bottom of the housing, and includes a pair of opposed c-shaped jaws. A longitudinally moveable jaw actuator is operably connected through a jaw control member via a rotation pin through diagonally extending aligned slots in the jaws whereby the jaws are opened when the jaw actuator is manually moved upwardly. A lower lip of a fish securely held and unhurt between the closed jaws will produce a digital display of the weight of the fish on the output screen. Housing contour facilitates hand-holding of the device and an array of unique digital data may be selectively displayed.

U.S. Pat. No. 4,910,717 to Terry discloses an apparatus for measuring distances comprising a circuit for sending an acoustic signal to a distant location, the distance of which is to be measured, a circuit for receiving back reflected acoustic energy, and electronic circuit means for eliminating spurious echoes by providing a threshold signal level above the signal level of said spurious echoes, and a timing circuit to time the interval between the transmission of the acoustic signal and receipt of the acoustic signal.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention provides a fish length measuring apparatus that incorporates a digital scale that allows fishermen to both measure and weigh their catch without touching or handling the fish. The inventive apparatus incorporates a housing with a fish-clasping assembly in the form of a lip grip that is used to grasp the mouth of the fish. A viewable digital output screen is mounted within the housing. The output screen is connected to a weight-sensing member (scale) whereby the weight of the fish generates a digital numeric display on the output screen equal to the fish weight. An ultrasonic transducer or other distance-measuring sensor device is mounted to an extendable assembly which allows the user to direct a measurement beam around larger fish which would otherwise block the beam. The distance-measuring device projects the beam towards a surface adjacent the tail of the fish (e.g., the ground, the boat deck, or the surface of the water) and detects the reflection from that surface, then calculates the distance (i.e., length) and displays the length measurement on the integrated output screen. The contour of the housing facilitates hand-holding of the apparatus, and a variety of unique digital data may be selectively displayed on the output screen.

The inventive apparatus thus allows the fisherman to lift the fish out of the water using a stress free lip grip, weigh the fish, and measure the length of the fish, all without human contact with the fishes' delicate body.

It is therefore an object of the present invention to provide a new and improved fish handling apparatus.

It is another object of the present invention to provide a new and improved fish scale.

A further object or feature of the present invention is a new and improved fish measuring device.

An even further object of the present invention is to provide a novel fish measuring apparatus with an integral scale.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 3 is a right side elevation view of the fish measuring apparatus illustrating a fish captured in the closed lip grip the weigh the fish, and the distance-measuring sensor directing a beam to the ground and back to measure the length of the fish; and FIG. 4 is a top view of the fish measuring apparatus illustrating the digital output screen.

DETAILED DESCRIPTION OF THE INVENTION

Figure 1:
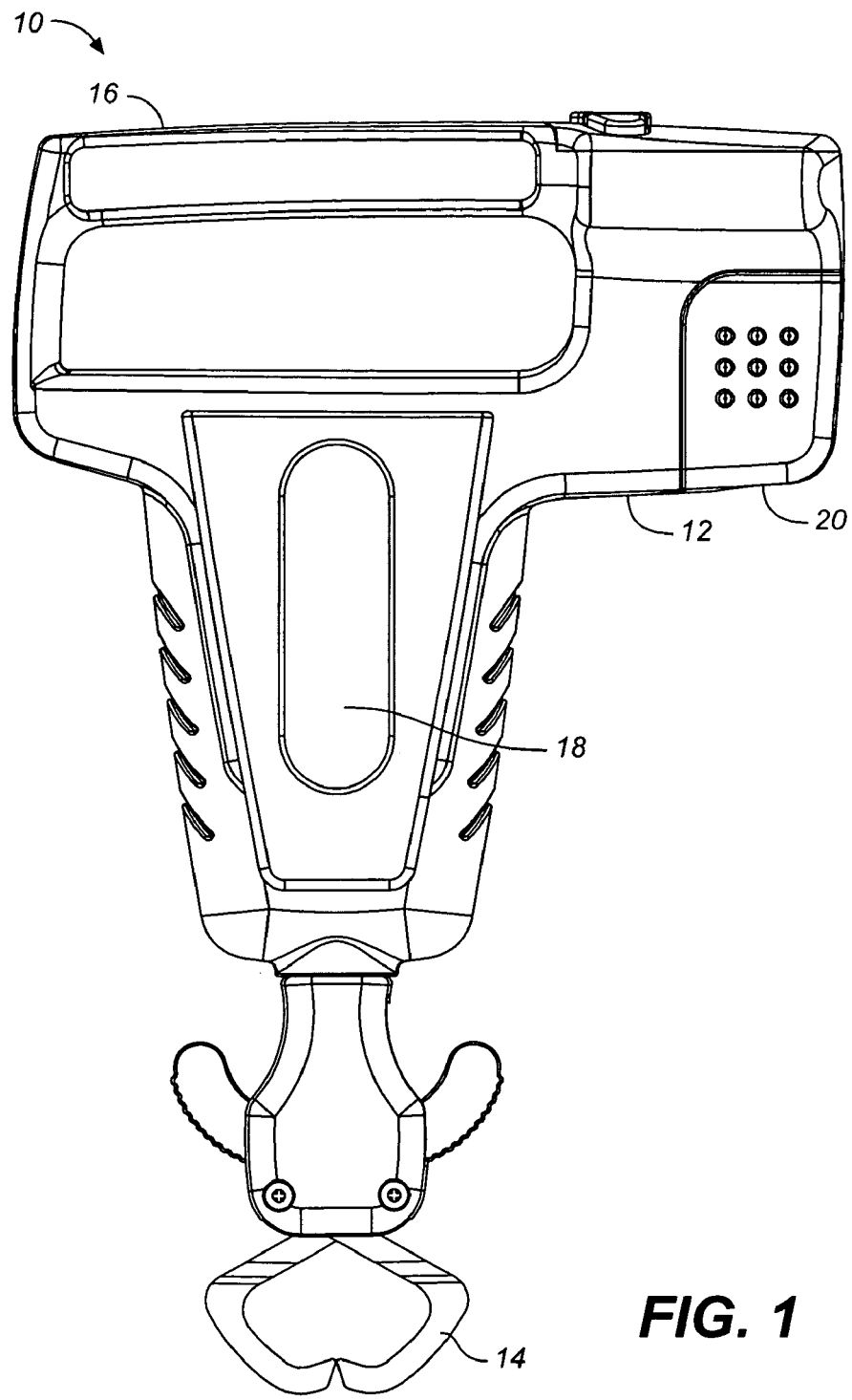
FIG. 1 is a left side elevation view of a fish measuring apparatus of this invention, illustrating the lip grip in its closed position.

Referring to FIGS. 1 through 4, wherein like reference numerals refer to like components in the various views, there is illustrated therein a new and improved fish measuring apparatus with integrated scale, generally denominated 10 herein.

FIG. 1 is a left side elevation view of a fish measuring apparatus 10 of this invention, illustrating a housing 12 with a fish-clasping assembly in the form of a lip grip 14 that is used to grasp the fish. A viewable digital output screen 16 is preferably mounted on the top of the housing. The output screen is connected to a weight-sensing member (scale) 18 whereby the weight of the fish generates a digital numeric display on the output screen equal to the fish weight. An ultrasonic transducer or other distance-measuring sensor device 20 is mounted in the housing and also connected to the output screen, and is calibrated to measure distance (length) using the lip grip 14 as the zero point.

Figure 2:
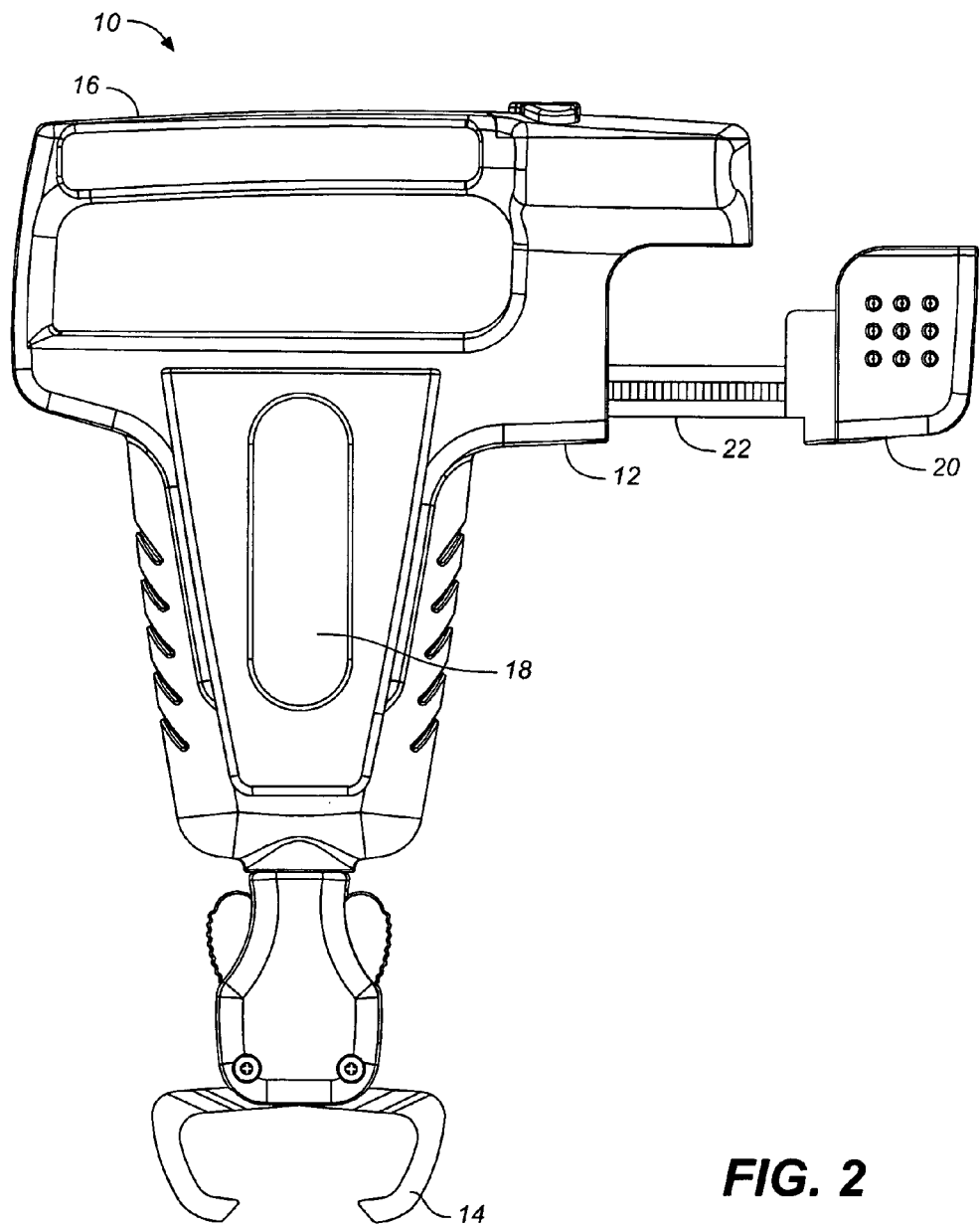
FIG. 2 is a left side elevation view of the fish measuring apparatus illustrating the lip grip in its open position and the distance-measuring sensor in its extended position.

FIG. 2 is a left side elevation view of the fish measuring apparatus 10 illustrating the lip grip 14 in its open position, and the distance-measuring sensor 20 extended by extendable assembly 22 which allows the user to direct a measurement beam around larger fish which would otherwise block the beam.

FIG. 3 is a right side elevation view of the fish measuring apparatus 10 illustrating the mouth of a fish F captured in the closed lip grip 14. The weight-sensing member (scale) 18 weighs the fish and generates a digital numeric display on the output screen equal to the fish weight, as is well known in the art. The distance-measuring sensor 20 directs a beam 24 to the ground 26 and back to measure the length of the fish. The distance-measuring device 20 projects the beam towards a surface (e.g., the ground, the boat deck, or the surface of the water) and detects the reflection from that surface, then calculates the distance (i.e., length) from the lip grip 14 to the surface 26 and displays the length measurement on the integrated output screen 16, using materials and circuitry that is well known in the art.

FIG. 4 is a top view of the fish measuring apparatus 10 illustrating the digital output screen 16. An array of unique digital data may be selectively displayed on the output screen, including fish length and weight. User programing input allows automatic access to minimum and maximum weight and length requirements for tournament release guidance, and aids in enabling the fisherman to obey local fishing regulations.

To use the apparatus, the fisherman squeezes the lip grip 14 open and attaches it to the fish's mouth. The fish is then held vertical with the tail slightly touching a solid object or surface (ground, boat deck, water, etc.), so that weight, length and legal limits can be displayed on the output screen.

Features of the inventive apparatus may include, but are not limited to, the following:

Weighs fish up to 100 lbs (45 kg) in pounds/ounces and kilograms.

Calculates fish length from 5 to 60 inches (13 to 154 cm) using laser guided ultrasound.

Durable solid state scale mechanism (no moving parts).

Laser pointer shows user where the ultrasound is aimed.

User programmable memory allows the user to program minimum or maximum weight for up to 10 species.

Auto Mode weighs, measures and compares the readings against user programmed minimums and maximums for weight and length.

Display gives "Thumbs Up" or "Thumbs Down" icon based on fish weight and length compared to user programming.

Embedded wax board and pencil keeps track of user programming.

Stainless steel lip grip safely and securely holds fish while measuring, and allows 360 degree rotation of catch for handling and picture taking.

Hold Mode allows user to lock the display on the current reading or hold the most accurate reading while using in a rocking boat.

Tare feature allows the user to offset the weight readings to 0 for use with weigh bags or containers.

Polarized LCD can be seen clearly with polarized glasses.

Silver screen backlit LCD.

Impact resistant and waterproof.

In its preferred embodiment, the inventive apparatus may be characterized as a fish measuring apparatus comprising a housing having a fish-clasping assembly to grasp a fish; a digital output screen mounted on the housing; a weight-sensing member connected to the fish-clasping assembly and the digital output screen to display the weight of the fish on the digital output screen; and a distance-measuring sensor mounted on the housing and connected to the digital output screen, the distance-measuring sensor calibrated to measure the distance from the fish-clasping assembly to a surface, wherein the fish-clasping assembly may be attached to a fish's mouth, and the fish held vertical with the fish's tail touching the surface, so that the weight and length of the fish can be displayed on the digital output screen.

Alternatively, the invention may be characterized as a fish measuring apparatus, comprising a sonic distance measuring device projecting a sonic beam; a fish-clasping assembly mounted co-axially with the sonic beam; a viewable digital output screen mounted within the housing; and a weight-sensing member that is connected to the fish-clasping assembly and the output screen.

The sonic beam is preferably mounted within the apparatus so that it can extended if necessary to project the sonic beam beyond a large fish that is being held in the fish clasping assembly (i.e., the beam is not blocked by the hanging fish) so that the beam can be projected to the ground.

The inventive apparatus uses a method of measuring distance to a surface (such as the ground, boat deck, or surface of the water), comprising the steps of: projecting a sonic beam; detecting a reflection of the sonic beam from the surface, thereby to determine a distance to the surface.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A fish measuring apparatus comprising:
   a housing having a fish-clasping assembly to grasp a fish;
   a digital output screen mounted on said housing;
   a weight-sensing member connected to said fish-clasping assembly and said digital output screen to display the weight of the fish on said digital output screen; and
   a distance-measuring sensor mounted on said housing on an extendable assembly which allows the user to direct a measurement beam around larger fish which would otherwise block said measurement beam, and connected to said digital output screen, said distance-measuring sensor calibrated to measure the distance from said fish-clasping assembly to a surface, wherein said fish-clasping assembly may be attached to a fish's mouth, and the fish held vertical with the fish's tail touching the surface, so that the weight and length of the fish can be displayed on said digital output screen.

2. A fish measuring apparatus comprising:
   a housing having a fish-clasping assembly to grasp a fish;
   a digital output screen mounted on said housing;
   a weight-sensing member connected to said fish-clasping assembly and said digital output screen to display the weight of the fish on said digital output screen; and
   a distance-measuring sensor comprising an ultrasonic transducer mounted on said housing and connected to said digital output screen, said distance-measuring sensor calibrated to measure the distance from said fish-clasping assembly to a surface, wherein said fish-clasping assembly may be attached to a fish's mouth, and the fish held vertical with the fish's tail touching the surface, so that the weight and length of the fish can be displayed on said digital output screen.

3. The fish measuring apparatus of claim 2 wherein said weight-sensing member comprises a digital scale.

4. The fish measuring apparatus of claim 2 wherein said fish-clasping assembly comprises a lip grip.

5. The fish measuring apparatus of claim 2 wherein said distance-measuring sensor is mounted on an extendable assembly which allows the user to direct a measurement beam around larger fish which would otherwise block said measurement beam.

6. The fish measuring apparatus of claim 1 wherein said fish-clasping assembly comprises a lip grip.

7. The fish measuring apparatus of claim 1 wherein said distance-measuring sensor comprises an ultrasonic transducer.

8. The fish measuring apparatus of claim 1 wherein said weight-sensing member comprises a digital scale.

* * * * *